United States Patent
Chang et al.

(10) Patent No.: US 11,263,272 B2
(45) Date of Patent: Mar. 1, 2022

(54) RANKING CANDIDATE DOCUMENTS FOR HUMAN ANNOTATION TASK IN REAL-TIME

(71) Applicant: INTERNATIONAL BUSINESS MACHINES CORPORATION, Armonk, NY (US)

(72) Inventors: Yannan Chang, Tokyo (JP); Kumiko Maeda, Tokyo (JP); Ryo Imai, Tokyo (JP); Hiroya Matsubara, Tokyo (JP); Takaaki Fukai, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 16/856,577

(22) Filed: Apr. 23, 2020

(65) Prior Publication Data
US 2021/0334315 A1  Oct. 28, 2021

(51) Int. Cl.
G06F 40/169 (2020.01)
G06F 16/93 (2019.01)
G06F 40/284 (2020.01)
G06N 20/00 (2019.01)

(52) U.S. Cl.
CPC ............ *G06F 16/93* (2019.01); *G06F 40/169* (2020.01); *G06F 40/284* (2020.01); *G06N 20/00* (2019.01)

(58) Field of Classification Search
CPC ...... G06F 16/93; G06F 40/169; G06F 40/284; G06N 20/00
See application file for complete search history.

(56) References Cited

U.S. PATENT DOCUMENTS

| 9,275,368 B1 | 3/2016 | Harpalani et al. |
| 9,971,848 B2 | 5/2018 | D'Souza et al. |
| 2010/0228738 A1* | 9/2010 | Mehta ............ G06F 40/169 707/748 |
| 2015/0293907 A1 | 10/2015 | Makino et al. |
| 2019/0180195 A1* | 6/2019 | Terry ............ G06F 16/34 |

FOREIGN PATENT DOCUMENTS

WO   201800274 A1   11/2018

OTHER PUBLICATIONS

Shannon, "A Mathematical Theory of Communication," Reprinted with corrections from The Bell System Technical Journal, vol. 27, pp. 379-423, 623-656, July, Oct. 1948.

* cited by examiner

*Primary Examiner* — Keith D Bloomquist
(74) *Attorney, Agent, or Firm* — Conley Rose, P.C.

(57) ABSTRACT

A system configured to rank and display candidate documents for human annotation task. The system executes instructions to receive a human annotation of a first unannotated document in a list of documents from a document set; update an annotated entities and corresponding entity types set based on the human annotation of the document from the document set; perform auto-mapping of annotated entities to corresponding entity types on a remaining set of documents in the document set based on the updated annotated entities and corresponding entity types set; calculate a score for each document in the remaining set of documents based on the auto-mapping of annotated entities; and update an order of the remaining set of documents being displayed for human annotation based on the calculated score for each document in the remaining set of documents in the document set.

20 Claims, 5 Drawing Sheets

| Document Name | Status | Last Modified | Actions |
|---|---|---|---|
| toyota1.txt | | Jul 19, 2019 12:33:19 PM | |
| toyota10.txt | | Jul 19, 2019 12:33:19 PM | |
| toyota11.txt | | Jul 19, 2019 12:33:19 PM | |
| toyota12.txt | | Jul 19, 2019 12:33:19 PM | |
| toyota13.txt | | Jul 19, 2019 12:33:19 PM | |
| toyota14.txt | | Jul 19, 2019 12:33:19 PM | |
| toyota15.txt | | Jul 19, 2019 12:33:19 PM | |
| toyota16.txt | | Jul 19, 2019 12:33:19 PM | |
| toyota17.txt | | Jul 19, 2019 12:33:19 PM | |

402 — header row

ANNOTATE 1 DOCUMENT

404 — REORDER BASED ON NEW MAPPING AND CALCULATED SCORE

RANKING CANDIDATE DOCUMENTS FOR HUMAN ANNOTATION TASK IN REAL-TIME

BACKGROUND

Natural language processing (NLP) is a subfield of linguistics, computer science, information engineering, and artificial intelligence that is concerned with the interactions between computers and human languages. In particular, NLP enables computers to process and analyze large amounts of natural language data.

SUMMARY

The disclosed embodiments include a system, computer program product, and computer-implemented method for ranking and displaying candidate documents in real-time for human annotation.

In an embodiment, a method for ranking and displaying candidate documents for human annotation task includes retrieving a document set, and displaying a list of documents from the document set for human annotation. The method then performs a real-time ranking candidate documents for human annotation loop that includes receiving a human annotation of a first unannotated document in the list of documents from the document set for human annotation, updating an annotated entities and corresponding entity types set based on the human annotation of the document from the document set, performing auto-mapping of annotated entities to corresponding entity types on a remaining set of documents in the document set based on the updated annotated entities and corresponding entity types set, calculating a score for each document in the remaining set of documents in the document set based on the auto-mapping of annotated entities to corresponding entity types on the remaining set of documents in the document set, and updating an order of the remaining set of documents being displayed for human annotation based on the calculated score for each document in the remaining set of documents in the document set.

In another embodiment, a system is configured to rank and display candidate documents for human annotation task. The system includes memory for storing instructions, and a processor configured to execute the instructions to: receive a human annotation of a first unannotated document in a list of documents from a document set for human annotation, wherein an unannotated document is a document that has not been annotated by a human; update an annotated entities and corresponding entity types set based on the human annotation of the document from the document set; perform auto-mapping of annotated entities to corresponding entity types on a remaining set of documents in the document set based on the updated annotated entities and corresponding entity types set; calculate a score for each document in the remaining set of documents in the document set based on the auto-mapping of annotated entities to corresponding entity types on the remaining set of documents in the document set; and update an order of the remaining set of documents being displayed for human annotation based on the calculated score for each document in the remaining set of documents in the document set.

Optionally, in some embodiments, the method includes pre-annotating documents in the document set using pre-defined dictionaries.

Optionally, in some embodiments, the method includes training a model using a bulk number of human annotated documents when the bulk number of human annotated documents is completed, and evaluating an F-score of the model after training the model using the bulk number of human annotated documents.

Optionally, in some embodiments, the method includes using the model to automatically annotate documents for NLP processing when the F-score of the model is higher than a predetermined threshold.

Optionally, in some embodiments, the score of a remaining document is based on a target distribution of entities that should be annotated for the remaining set of documents in the document set.

Optionally, in some embodiments, the score of a remaining document is based on a token variety contained in the remaining document.

Other embodiments and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented.

DETAILED DESCRIPTION

In natural language processing, human annotation of documents is a heavy, but important task for creating a teacher dataset that is used for training a machine learning model. Because there is a vast amount of available documents that can be annotated, it is difficult to annotate all of them or determine which document set should be annotated in a best practice. It would be beneficial to be able to select more informative documents for human annotation because it would reduce the human workload needed for creating a high performance machine learning model.

To address the above issues, the disclosed embodiments propose various systems and methods for ranking the candidate documents during the human annotation task in real-time based on the content of the documents. The result is that a user can finish the annotation task using a relatively smaller document set by annotating documents in an order that helps balance entity distribution, as well as being able to select a better candidate document set through all of the available documents if necessary. The disclosed embodiments can improve work effectivity, annotation quality, and the performance of the machine learning model.

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to." Unless otherwise indicated, as used throughout this document, "or" does not require mutual exclusivity, and the singular forms "a", "an" and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a module may also refer to a particular set of functions, software instructions, or circuitry configured to perform a specific task. For example, a module may comprise of software components such as, but not limited to, data access objects, service components, user interface components, application programming interface (API) components; hardware components such as electrical circuitry, processors, and memory; and/or a combination thereof. As referenced herein, computer executable instructions may be in any form including, but not limited to, machine code, assembly code, and high-level programming code written in any programming language.

Figure 1:
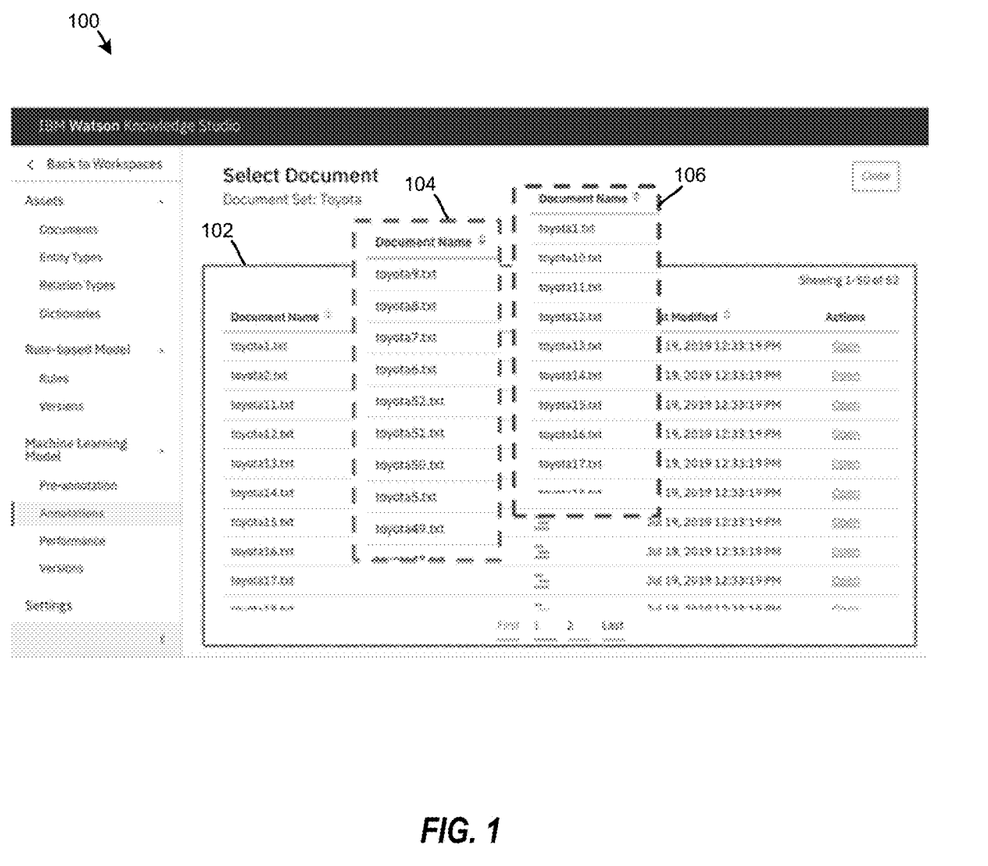
FIG. 1 is a schematic diagram illustrating a screenshot of a human annotation page in accordance with an embodiment of the present disclosure.

FIG. 1 is a schematic diagram illustrating a screenshot of a human annotation page 100 in accordance with an embodiment of the present disclosure. The human annotation page 100 can be part of a larger development application such as, but not limited to, IBM Watson Knowledge Studio®, which is a cloud-based application that enables developers and domain experts to collaborate on the creation of custom annotator components that can be used to identify mentions and relations in unstructured text. Currently, the human annotation task involves a user requesting a particular document set and then annotating all the documents within the document set. The human annotation page 100 depicts three available options for displaying the list of documents to be annotated by the user. The first list display view 102 presents the list of documents in alphabetical order by the document name, the second list display view 104 presents the list of documents in reverse alphabetical order by the document name, and the third list display view 106 presents the list of documents in a random order. These three display views do not provide the user with any meaningful information as to which document set should be selected, and in what order the documents within a document set should be annotated, to reduce the number of human annotated documents needed to produce a good model.

Figure 2:
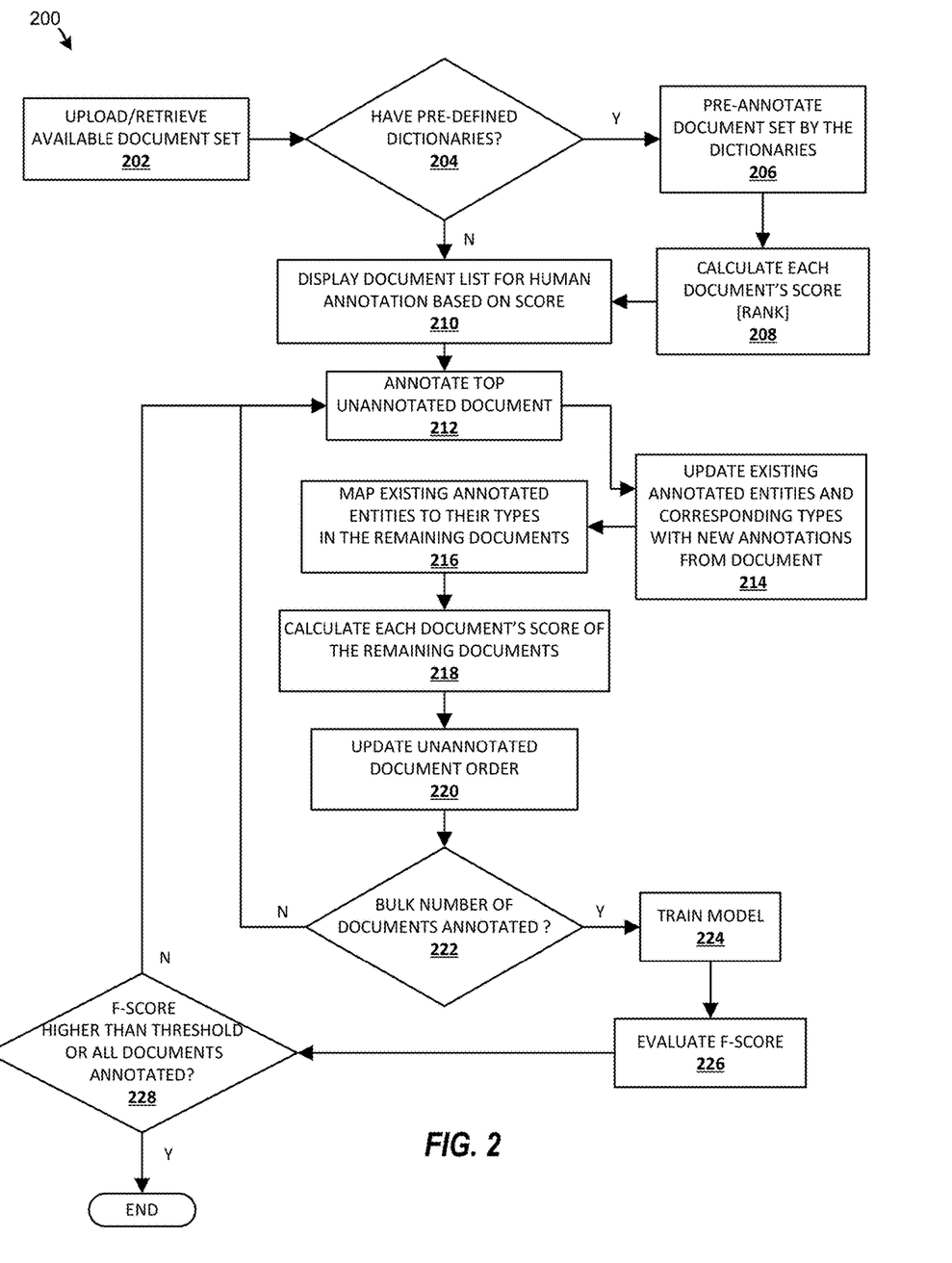
FIG. 2 is a flowchart diagram illustrating a method for ranking candidate documents in real-time for human annotation in accordance with an embodiment of the present disclosure.

FIG. 2 is a flowchart diagram illustrating a method 200 for ranking candidate documents in real-time for human annotation in accordance with an embodiment of the present disclosure. The method 200 may be performed by any type of system such as, but not limited to, system 400 described in FIG. 4. The method 200 begins, at step 202, by retrieving or uploading a document set. The documents set may be retrieved from a local or remote document repository. In an embodiment, the document sets comprise text documents that are normally used within the industry for NLP training. Alternatively, the document set can be retrieved or generated by web scraping the Internet.

At step 204, the method 200 determines whether there are any predefined dictionaries. Predefined dictionaries are dictionaries or data files that have predefined entities for various entity types. An entity is a specific noun and an entity type is an entity category for that specific noun. For example, "John Smith" is an entity that corresponds or to a "Person" entity type. There may be a predefined dictionary for particular fields or industry such as science, medicine, business, or technical dictionaries. For example, a predefined dictionary can include an entity type called Company, and for that entity type have predefined entities that are known companies such as, but not limited to, IBM®, Google®, Microsoft®, and Boeing®.

If there are predefined dictionaries, the method 200, at step 206, pre-annotates documents in the document set using the predefined dictionaries, and calculates, at step 208, a pre-score for each document in the document set based on the pre-annotations. Pre-annotation means annotations performed on the documents prior to the human annotations (e.g., based on the predefined dictionaries). A pre-score is a score generated based on the pre-annotation of the documents.

At step 210, the method 200 displays the list of documents from the document set for human annotation. Human annotation means that a human annotates texts within a document with suitable metadata that help machines to understand the speeches with sentence-level accuracy of the document. Human annotation can be performed for all types of texts available in various languages. If the documents were pre-annotated at step 206 and pre-scored at step 208, the method 200, at step 210, displays the list of documents from the document set for human annotation based on the pre-score for each document in the document set.

The method 200 then performs a real-time ranking of candidate documents for human annotation loop (steps 212-222) until a bulk number of documents in the document set have been human annotated. The bulk number can be user-specified. In an embodiment, every time the bulk number of documents is annotated, the system trains and evaluates the model in the background. The smaller the bulk number, the more frequently the model is re-trained and re-evaluated. This reduces excess human annotation due to the threshold detection lag, while more computation resources would be required. The bigger the bulk number, the higher the chance that human resources are wasted by annotating more documents than necessary to train the model.

In an embodiment, the real-time ranking of candidate documents for human annotation loop starts, at step 212, by receiving a human annotation of a first unannotated document in the list of documents from the document set for human annotation. An unannotated document is a document that has not been annotated by a human. At step 214, the method 200 updates an existing, if any, annotated entities and corresponding entity types set (e.g., from previously annotated documents) to include the human annotation of the document from the document set. If there are no existing annotated entities and corresponding entity types set, then the annotated entities and corresponding entity types set would only include the annotated entities and corresponding entity types from the single human annotated document performed at step 212.

At step 216, the method 200 performs auto-mapping of annotated entities to corresponding entity types on a remaining set of documents in the document set (i.e., the remaining unannotated documents) based on the updated annotated entities and corresponding entity types set. Auto-mapping means the same tokens that have been annotated in previous documents are automatically mapped to the specified entity types in the remaining documents of the document set. In an embodiment, the score of a remaining document is based on two factors. The first factor is whether a document includes a plurality of entities whose annotation is far away from a target distribution of entities that should be annotated. The target distribution is a ratio of the distribution of a particular entity type over all the documents being annotated. In an embodiment, the target distribution can be specified by a user, learned from the documents, or even simplified as a uniform probability distribution. The second factor is whether a document includes a higher token variety. The goal of these two factors is to balance the distribution of the entities. The first factor is referenced by existing annotated entities that helps in balancing the annotation number with the target. The second factor can be referred to as a detector for figuring out the potential entities that still have not been annotated.

Figure 3:
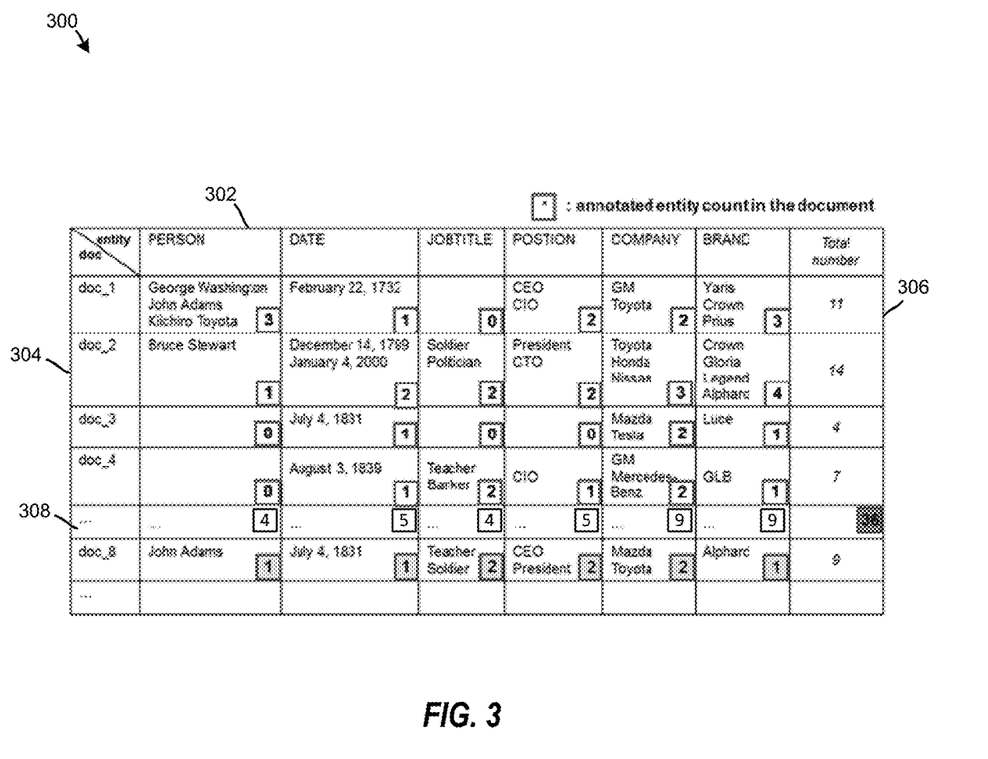
FIG. 3 is a schematic diagram illustrating a sample table that depicts the entity count in a set of documents that is used for calculating a document score in accordance with an embodiment of the present disclosure.

As an example, suppose a target distribution of entity types that should be annotated is represented by the following equation:

$$\lambda=(\lambda_1,\lambda_2,\ldots,\lambda_k),(0<\lambda<1 \text{ and sum}(\lambda_1,\lambda_2,\ldots,\lambda_k)=1)$$

where $\lambda$ is an entity type, and k is a total number of entity types. For example, $\lambda_1$ can be the entity type PERSON, $\lambda_2$ can be the entity type COMPANY, and so on. In an embodiment, the target distribution of the entity types is specified to be 1/k, meaning that the goal is to have an equal number of each of the entity types in the selected annotated documents used to train the model. Thus, if a first annotated document has a disproportionate number of a particular entity type (e.g., $\lambda_1$), a remaining document that would balance out the various other entity types would receive a higher score than a document that also includes a disproportionate number of the particular immunity type ($\lambda_1$). An example of an entity type count chart is illustrated in the table in FIG. 3.

In an embodiment, the score for a document i in the remaining unannotated document list is calculated using the following formula:

$$\text{Score}(i)=\alpha\Sigma_{m=0}^{k}((\lambda_m-p_{setm})p_{docm})-\beta \text{ Entropy(token)}$$

In the above equation, $\alpha$ and $\beta$ are coefficients, k is a total number of entity types, $p_{set}$ is the annotated entity distribution over all document set, $p_{doc}$ is a mapped entity distribution in the document i, and Entropy(token) denotes a token entropy of the document i. In an embodiment, the $\alpha$ and $\beta$ coefficients can be adjusted as necessary to produce satisfactory results. An example of determining the $p_{set}$ and the $p_{doc}$ for calculating a score of a remaining document is described below in FIG. 3. The token entropy is [[inventors-please define/describe what you mean by a token entropy of the document.]]

At step 220, the method 200 updates the order of the remaining set of unannotated documents being displayed for human annotation based on the calculated score for each unannotated document in the remaining set of documents in the document set. Thus, the most useful/informative unannotated document in the remaining set of documents in the document set for training the model should now be at the top of the list of remaining unannotated documents being displayed for human annotation.

At step 222, the method 200 determines whether the bulk number of documents has been annotated. As stated above, the bulk number of documents can be a user-specified number that indicates how often the system trains and evaluates a machine learning model. If, at step 222, the bulk number of documents has not been annotated, the method 200 repeats the real-time ranking of candidate documents for human annotation loop (steps 212-222) with the next/top unannotated document in the remaining set of documents in the document set.

If, at step 222, the bulk number of documents has been annotated, the method 200 trains a model, at step 224, using the bulk number of human annotated documents. At step 226, the method 200 evaluates an F-score of the model after it has been trained with the bulk number of human annotated documents. The F-score, also called the F1 score or F measure, is a measure of the model's accuracy. The F-score is defined as the weighted harmonic mean of the model's precision and recall. Precision, also called the positive predictive value, is the proportion of positive results that truly are positive. Recall, also called sensitivity, is the ability of a model to correctly identify positive results to get the true positive rate. The F-score balances the use of precision and recall. The F-score can provide a realistic measure of a model's performance by using both precision and recall. In an embodiment, the F-score is calculated according to the following formula:

$$F=\left(\frac{2}{\text{recall}^{-1}+\text{precision}^{-1}}\right).$$

The F-score reaches the best value, meaning perfect precision and recall, at a value of 1. The worst F-score, which means lowest precision and lowest recall, would be a value of 0.

At step 228, the method 200 determines whether the F-score of the model is higher than a threshold or whether all the documents in the documents set have been annotated. The threshold can be defined by a user. For example, a user can specify that they want the model to at least have an F-score of 0.9. If the method 200 determines that the F-score of the model is higher than the threshold, the method 200 terminates because the model has been sufficiently trained. The model can then be used to automatically annotate any received document in performing NLP processing.

If, at step 228, the F-score of the model does not satisfy the threshold and there are additional documents to be annotated in the document set, the method 200 repeats the real-time ranking of candidate documents for human annotation loop (steps 212-222) with the next/top unannotated document in the remaining set of documents in the document set. In an embodiment, if all the documents in the documents set have been annotated before the F-score of the model is higher than the threshold, the method 200 terminates and additional document sets can be used to further train the model in accordance with the method 200.

FIG. 3 is a schematic diagram illustrating a sample table 300 that depicts the entity count in a set of documents used for calculating a document score in accordance with an embodiment of the present disclosure. The top row 302 of the sample table 300 contains various entities that can be found in a document. The first column 304 of the sample table 300 contains the document name. The last column 306 of the sample table 300 contains the total number of entities that are annotated in the document.

In the depicted embodiment, the entities that are annotated in the documents include Person, Date, Job Title, Position, Company, and Brand. The sample table 300 depicts the entity count for each of the entities in four documents (doc_1, doc_2, doc_3, and doc_4) that have already been annotated. For example, for doc_1, there are three instances of the Person entity type annotated in the document. Row 308 of the sample table 300 indicates the total count for each entity type in the documents that have already been annotated. In the depicted embodiment, doc_8 represents a document currently being annotated.

As stated above, in an embodiment, the score for a document i in the remaining unannotated document list can be calculated using the formula: $Score(i) = \alpha \Sigma_{m=0}^{k}((\lambda_m - p_{setm})p_{docm}) - \beta$ Entropy(token). Using the example in FIG. 3, the total number of entity types (k) is 6. The total number of entities from the documents that have been annotated (doc_1, doc_2, doc_3, and doc_4) is 36. Therefore, the annotated entity distribution over all documents that have been annotated in the document sets ($p_{set}$) is 4/36 for $\lambda_1$, 5/36 for $\lambda_2$, 4/36 for $\lambda_3$, 5/36 for $\lambda_4$, 9/36 for $\lambda_5$, and 9/36 for $\lambda_6$. $p_{doc}$ is a mapped entity distribution in the document i. In FIG. 3, $p_{doc}$ for doc_8 would be 1/9 for $\lambda_1$, 1/9 for $\lambda_2$, 2/9 for $\lambda_3$, 2/9 for $\lambda_4$, 2/9 for $\lambda_5$, and 1/9 for $\lambda_6$, where 9 is the total number of entities annotated in the doc_8. Entropy (token) denotes a token of the document i as described above.

Figure 4:
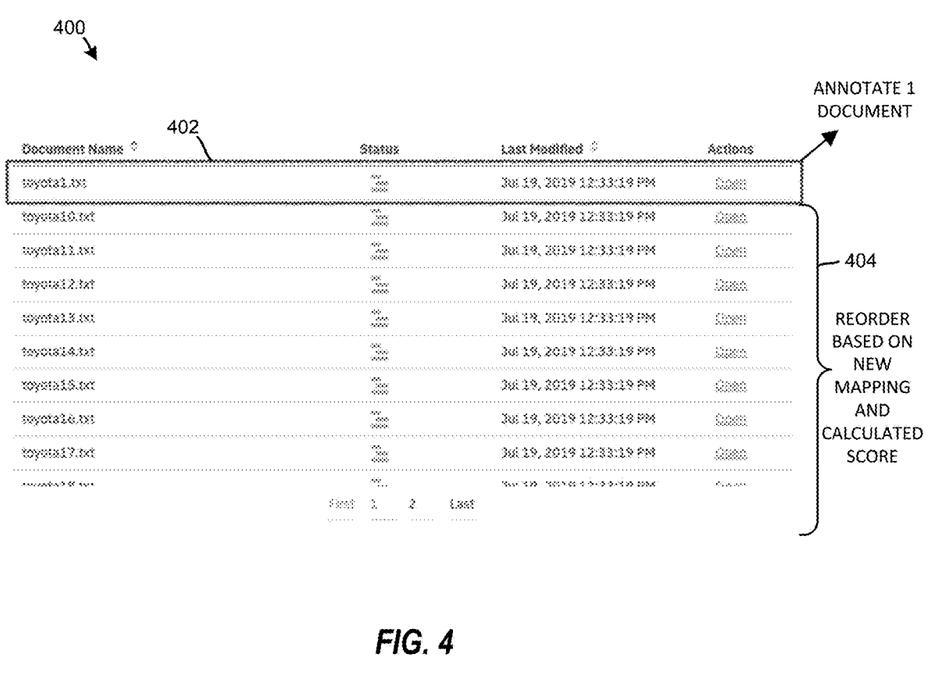
FIG. 4 is a schematic diagram illustrating a user interface for performing human annotation on a set of documents in accordance with an embodiment of the present disclosure.

FIG. 4 is a schematic diagram illustrating a user interface 400 for performing human annotation on a set of documents in accordance with an embodiment of the present disclosure. In the depicted embodiment, the first document 402 displayed in the set of documents is annotated and then the remaining documents 404 are reordered based on the new mapping and calculated score of the remaining documents in real-time after the annotation to the first document is taken into account as described in FIG. 2. Once the remaining documents 404 are reordered, the document displayed at the top of the remaining documents 404 is the document that is scored the highest and would be most beneficial to be annotated next. The documents below that document would be reordered once that document is annotated, and the process would repeat as described FIG. 2 until a satisfactory model has been trained or there are no more documents in the document set.

Figure 5:
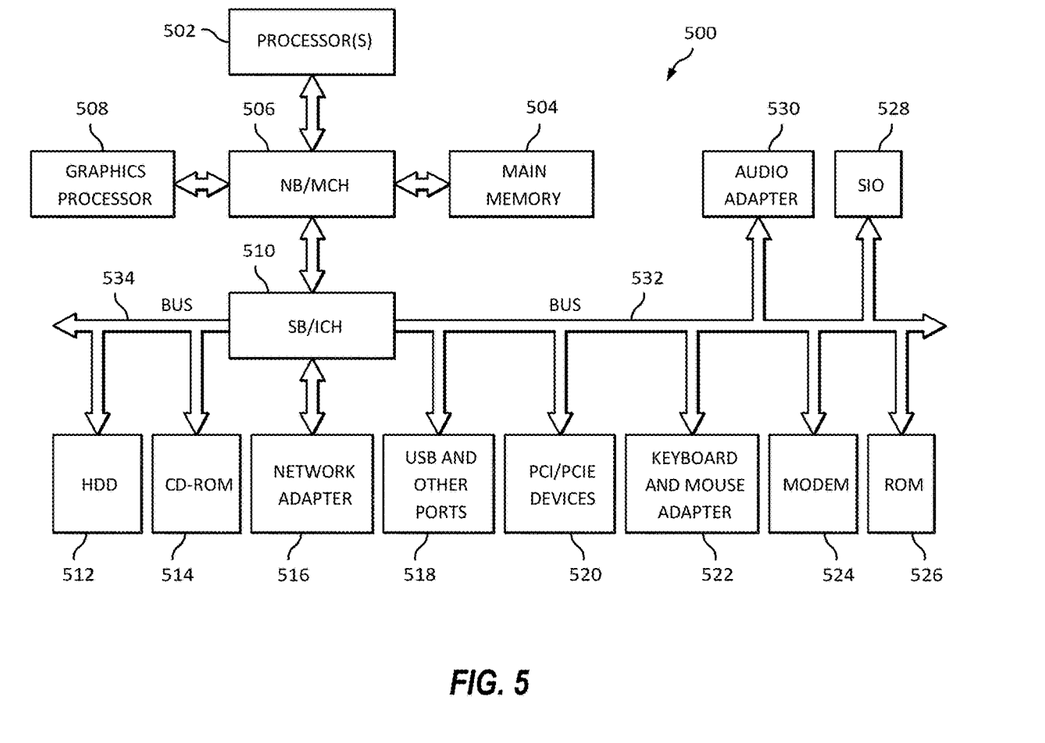
FIG. 5 is a block diagram illustrating a hardware architecture of a system according to an embodiment of the present disclosure in which aspects of the illustrative embodiments may be implemented.

FIG. 5 is a block diagram illustrating a hardware architecture of a system 500 according to an embodiment of the present disclosure in which aspects of the illustrative embodiments may be implemented. For example, the data processing system 500 may be configured to store and execute instructions for performing the process described in FIG. 2 and FIG. 3. In the depicted example, the data processing system 500 employs a hub architecture including north bridge and memory controller hub (NB/MCH) 506 and south bridge and input/output (I/O) controller hub (SB/ICH) 510. Processor(s) 502, main memory 504, and graphics processor 508 are connected to NB/MCH 506. Graphics processor 508 may be connected to NB/MCH 506 through an accelerated graphics port (AGP). A computer bus, such as bus 532 or bus 534, may be implemented using any type of communication fabric or architecture that provides for a transfer of data between different components or devices attached to the fabric or architecture.

In the depicted example, network adapter 516 connects to SB/ICH 510. Audio adapter 530, keyboard and mouse adapter 522, modem 524, read-only memory (ROM) 526, hard disk drive (HDD) 512, compact disk read-only memory (CD-ROM) drive 514, universal serial bus (USB) ports and other communication ports 518, and peripheral component interconnect/peripheral component interconnect express (PCI/PCIe) devices 520 connect to SB/ICH 510 through bus 532 and bus 534. PCI/PCIe devices may include, for example, Ethernet adapters, add-in cards, and personal computing (PC) cards for notebook computers. PCI uses a card bus controller, while PCIe does not. ROM 526 may be, for example, a flash basic input/output system (BIOS). Modem 524 or network adapter 516 may be used to transmit and receive data over a network.

HDD 512 and CD-ROM drive 514 connect to SB/ICH 510 through bus 534. HDD 512 and CD-ROM drive 514 may use, for example, an integrated drive electronics (IDE) or serial advanced technology attachment (SATA) interface. In some embodiments, HDD 512 may be replaced by other forms of data storage devices including, but not limited to, solid-state drives (SSDs). A super I/O (SIO) device 528 may be connected to SB/ICH 510. SIO device 528 may be a chip on the motherboard configured to assist in performing less demanding controller functions for the SB/ICH 510 such as controlling a printer port, controlling a fan, and/or controlling the small light emitting diodes (LEDS) of the data processing system 500.

The data processing system 500 may include a single processor 502 or may include a plurality of processors 502. Additionally, processor(s) 502 may have multiple cores. For example, in one embodiment, data processing system 500 may employ a large number of processors 502 that include hundreds or thousands of processor cores. In some embodiments, the processors 502 may be configured to perform a set of coordinated computations in parallel.

An operating system is executed on the data processing system 500 using the processor(s) 502. The operating system coordinates and provides control of various components within the data processing system 500 in FIG. 5. Various applications and services may run in conjunction with the operating system. Instructions for the operating system, applications, and other data are located on storage devices, such as one or more HDD 512, and may be loaded into main memory 504 for execution by processor(s) 502. In some embodiments, additional instructions or data may be stored on one or more external devices. The processes described herein for the illustrative embodiments may be performed by processor(s) 502 using computer usable program code, which may be located in a memory such as, for example, main memory 504, ROM 526, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for ranking candidate documents for human annotation task, the method comprising:
retrieving a document set;
displaying a list of documents from the document set for human annotation; and
performing a real-time ranking candidate documents for human annotation loop comprising:
receiving a human annotation of a first unannotated document in the list of documents from the document set for human annotation, wherein an unannotated document is a document that has not been annotated by a human, wherein the human annotation annotates entities in the first unannotated document with their corresponding entity types, and wherein an entity is a specific noun and an entity type is an entity category for the specific noun;
updating an annotated entities and corresponding entity types set based on the human annotation of the document from the document set;
performing auto-mapping of annotated entities to corresponding entity types on a remaining set of documents in the document set based on the updated annotated entities and corresponding entity types set;
calculating a score for each document in the remaining set of documents in the document set based on the auto-mapping of annotated entities to corresponding entity types on the remaining set of documents in the document set; and
updating an order of the remaining set of documents being displayed for human annotation based on the calculated score for each document in the remaining set of documents in the document set.

2. The method of claim 1, further comprising:
pre-annotating documents in the document set using predefined dictionaries;
calculating a pre-score for each document in the document set based on the pre-annotations; and
wherein displaying the list of documents from the document set for human annotation comprises displaying the list of documents in an order based on the pre-score for each document in the document set.

3. The method of claim 1, further comprising:
training a model using a bulk number of human annotated documents when the bulk number of human annotated documents is completed;
evaluating an F-score of the model after training the model using the bulk number of human annotated documents; and
repeating the real-time ranking candidate documents for human annotation loop until one of a first condition and a second condition is satisfied, the first condition is that the F-score of the model is higher than a predetermined threshold, and the second condition is that there are no unannotated documents left in the document set.

4. The method of claim 3, wherein when the first condition is satisfied, the method further comprises using the model to automatically annotate documents for natural language processing (NLP).

5. The method of claim 1, wherein the score of a remaining document is based on a target distribution of entities that should be annotated for the remaining set of documents in the document set, and on a token variety contained in the remaining document.

6. The method of claim 1, wherein the score for a document i is calculated using the formula: $\text{Score}(i) = \alpha \Sigma_{m=0}^{k} ((\lambda_m - p_{setm}) p_{docm}) - \beta \text{ Entropy(token)}$, wherein $\alpha$ and $\beta$ are the coefficients, k is a total number of entity types, $p_{set}$ is annotated entity distribution over all document sets, $p_{doc}$ is a mapped entity distribution in the document i, and Entropy (token) denotes a token entropy of the document i.

7. A system configured to rank and display candidate documents for human annotation task, the system comprising memory for storing instructions, and a processor configured to execute the instructions to:
receive a human annotation of a first unannotated document in a list of documents from a document set for human annotation, wherein an unannotated document is a document that has not been annotated by a human, and wherein the human annotation annotates entities in the first unannotated document with their corresponding entity types, and wherein an entity is a specific noun and an entity type is an entity category for the specific noun;
update an annotated entities and corresponding entity types set based on the human annotation of the document from the document set;
perform auto-mapping of annotated entities to corresponding entity types on a remaining set of documents in the document set based on the updated annotated entities and corresponding entity types set;
calculate a score for each document in the remaining set of documents in the document set based on the auto-mapping of annotated entities to corresponding entity types on the remaining set of documents in the document set; and
update an order of the remaining set of documents being displayed for human annotation based on the calculated score for each document in the remaining set of documents in the document set.

8. The system of claim 7, wherein the processor is further configured to execute the instructions to pre-annotate documents in the document set using predefined dictionaries.

9. The system of claim 7, wherein the score of a remaining document is based on a target distribution of entities that should be annotated for the remaining set of documents in the document set.

10. The system of claim 9, wherein the score of a remaining document is further based on a token variety contained in the remaining document.

11. The system of claim 7, wherein the processor is further configured to train a model using a bulk number of human annotated documents when the bulk number of human annotated documents is completed.

12. The system of claim 11, wherein the processor is further configured to evaluate an F-score of the model against a predetermined threshold after training the model using the bulk number of human annotated documents.

13. The system of claim 12, wherein the processor is further configured to use the model to automatically annotate documents for natural language processing (NLP) when the F-score of the model satisfies the predetermined threshold.

14. The system of claim 7, wherein the processor is further configured to calculate the score for a document i using the formula: $\text{Score}(i) = \alpha \Sigma_{m=0}^{k} = ((\lambda - p_{setm}) p_{docm}) - \beta \text{ Entropy(token)}$, wherein $\alpha$ and $\beta$ are the coefficients, k is a total number of entity types, $p_{set}$ is annotated entity distribution over all document sets, $p_{doc}$ is a mapped entity distribution in the document i, and Entropy(token) denotes a token entropy of the document i.

15. A computer program product for ranking candidate documents for human annotation task, the computer program product comprising a computer readable storage medium having program instructions embodied therewith, the program instructions executable by a processor of a system to cause the system to:

receive a human annotation of a first unannotated document in a list of documents from a document set for human annotation, wherein an unannotated document is a document that has not been annotated by a human, and wherein the human annotation annotates entities in the first unannotated document with their corresponding entity types, and wherein an entity is a specific noun and an entity type is an entity category for the specific noun;

update an annotated entities and corresponding entity types set based on the human annotation of the document from the document set;

perform auto-mapping of annotated entities to corresponding entity types on a remaining set of documents in the document set based on the updated annotated entities and corresponding entity types set;

calculate a score for each document in the remaining set of documents in the document set based on the auto-mapping of annotated entities to corresponding entity types on the remaining set of documents in the document set; and update an order of the remaining set of documents being displayed for human annotation based on the calculated score for each document in the remaining set of documents in the document set.

16. The computer program product of claim 15, the program instructions executable by the processor of the system to further cause the system to pre-annotate documents in the document set using predefined dictionaries.

17. The computer program product of claim 15, wherein the score of a remaining document is based on a target distribution of entities that should be annotated for the remaining set of documents in the document set.

18. The computer program product of claim 15, wherein the program instructions executable by the processor of the system to further cause the system to train a model using a bulk number of human annotated documents when the bulk number of human annotated documents is completed.

19. The computer program product of claim 18, the program instructions executable by the processor of the system to further cause the system to evaluate an F-score of the model against a predetermined threshold after training the model using the bulk number of human annotated documents.

20. The computer program product of claim 19, the program instructions executable by the processor of the system to further cause the system to use the model to automatically annotate documents for natural language processing (NLP) when the F-score of the model satisfies the predetermined threshold.

* * * * *